(12) United States Patent
Tsuchiya (10) Patent No.: US 8,055,409 B2
(45) Date of Patent: Nov. 8, 2011

(54) POWER STEERING SYSTEM AND CONTROL METHOD OF THE SAME

(75) Inventor: Yoshiaki Tsuchiya, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 241 days.

(21) Appl. No.: 11/488,152

(22) Filed: Jul. 18, 2006

(65) Prior Publication Data

US 2007/0021889 A1    Jan. 25, 2007

(30) Foreign Application Priority Data

Jul. 25, 2005   (JP) ................................. 2005-214479

(51) Int. Cl.
  *A01B 69/00*   (2006.01)
  *B62D 6/00*    (2006.01)
  *B62D 11/00*   (2006.01)
  *B62D 12/00*   (2006.01)
  *B63G 8/20*    (2006.01)
  *B63H 25/04*   (2006.01)

(52) U.S. Cl. ............................................ 701/41; 701/1

(58) Field of Classification Search ................ 701/1, 41; 180/6.2, 204; 280/5.51, 5.511, 5.512, 5.15
   See application file for complete search history.

(56) References Cited

U.S. PATENT DOCUMENTS

| | | | |
|---|---|---|---|
| 5,904,223 A * | 5/1999 | Shimizu et al. | 180/443 |
| 5,925,082 A | 7/1999 | Shimizu et al. | |
| 6,185,492 B1 | 2/2001 | Kagawa et al. | |
| 2002/0007239 A1* | 1/2002 | Matsumoto et al. | 701/41 |
| 2003/0045982 A1* | 3/2003 | Kondo et al. | 701/41 |
| 2003/0106736 A1* | 6/2003 | Kogiso et al. | 180/446 |
| 2004/0262063 A1* | 12/2004 | Kaufmann et al. | 180/169 |
| 2005/0200088 A1* | 9/2005 | Sawada et al. | 280/5.507 |

FOREIGN PATENT DOCUMENTS

| | | |
|---|---|---|
| DE | 197 02 383 A 1 | 8/1997 |
| DE | 198 30 548 A 1 | 2/1999 |
| DE | 103 12 513 A1 | 9/2004 |
| JP | 9-207800 | 8/1997 |
| JP | 11-73597 | 3/1999 |
| JP | 2000-142441 | 5/2000 |
| JP | 3185726 | 5/2001 |
| JP | 2003-252222 | 9/2003 |
| JP | 2005-7989 | 1/2005 |
| JP | 2005-88806 | 4/2005 |

* cited by examiner

*Primary Examiner* — Tuan C To
*Assistant Examiner* — Imran Mustafa
(74) *Attorney, Agent, or Firm* — Oblon, Spivak, McClelland, Maier & Neustadt, L.L.P.

(57) ABSTRACT

With a power steering system and a control method of a power steering system provided, a basic assist control amount is calculated based on a steered state of a driver's steering wheel. A compensation control amount used to compensate for the basic assist control amount is calculated, and corrected, during calculation of the compensation control amount, based on a lane-position maintenance assist control amount which is calculated based on a running state of a vehicle and which is used to maintain a predetermined lane-position. A target assist control amount applied to a steering mechanism is calculated based on the basic assist control amount, the lane-position maintenance assist control amount, and the compensation control amount.

12 Claims, 10 Drawing Sheets

POWER STEERING SYSTEM AND CONTROL METHOD OF THE SAME

INCORPORATION BY REFERENCE

The disclosure of Japanese Patent Application No. 2005-214479 filed on Jul. 25, 2005, including the specification, drawings and abstract is incorporated herein by reference in its entirety.

BACKGROUND OF THE INVENTION

1. Field of the Invention

The invention relates generally to a power steering system and a control method of a power steering system. More specifically, the invention relates to a power steering system used in a lane-position maintenance assist apparatus that assists a vehicle in maintaining the proper lane-position, and a control method of a power steering system.

2. Description of the Related Art

For example, Japanese Patent No. 3185726 describes a lane-position maintenance assist apparatus that assists a vehicle in maintaining the proper lane-position. The lane-position maintenance assist apparatus initially calculates the lane-offset amount that is the lateral offset between the center line of the vehicle, extending in the longitudinal direction of the vehicle, from the center line of the cruising lane; the yaw angle which the center line of the cruising lane forms with the center line of the vehicle, etc. by processing the image of the cruising lane captured by, for example, a CCD camera. Based on the result of calculation, the lane-position maintenance assist apparatus calculates the steering torque for assisting the vehicle in maintaining the proper lane-position (hereinafter, sometimes referred to as the "steering torque for lane-position maintenance assist"). The lane-position maintenance assist apparatus assists the vehicle in maintaining the proper lane-position by driving an electric motor included in an electric power steering system based on the calculated steering torque.

However, the lane-position maintenance assist apparatus drives the electric power steering system independently of the steering operation performed by a driver, that is, the input of the driver. As a result, the driver may feel a sense of discomfort, and the steering feel may deteriorate.

For example, when the driver operates a driver's steering wheel during the lane-position maintenance assist control, if the direction in which the driver operates the driver's steering wheel is the same as the direction in which the steering torque for lane-position maintenance assist is applied, the driver's steering wheel is operated unexpectedly lightly, causing the driver to feel unexpectedly less resistance in the operation of the driver's steering wheel. On the other hand, if the direction in which the driver operates the driver's steering wheel is opposite to the direction in which the steering torque for proper lane-position maintenance assist is applied, the driver's steering wheel is operated unexpectedly heavily, causing the driver to feel unexpectedly high resistance in the operation of the driver's steering wheel. Also, if the steering torque for lane-position maintenance assist fluctuates, the driver's steering wheel vibrates due to the reaction force caused by such fluctuation.

SUMMARY OF THE INVENTION

The invention is made to solve the problem described above. Embodiments of the invention, therefore, provide a power steering system and a control method thereof with which the steering feel during the lane-position maintenance assist control improves.

A first aspect of the invention relates to a power steering system including a controller that calculates the basic assist control amount based on the steered state of a driver's steering wheel, and that calculates the compensation control amount used to compensate for the basic assist control amount and corrects, during calculation of the compensation control amount, the compensation control amount based on the lane-position maintenance assist control amount which is calculated based on the running state of a vehicle and which is used to maintain a predetermined lane-position. The controller further calculates the target assist control amount applied to a steering mechanism based on the basic assist control amount, the lane-position maintenance assist control amount, and the compensation control amount.

A second aspect of the invention relates to a control method of a power steering system. According to the control method, first, the basic assist control amount is calculated based on the steered state of a driver's steering wheel. Then, the compensation control amount used to compensate for the basic assist control amount is calculated and corrected, during calculation of the compensation control amount, based on the lane-position maintenance assist control amount which is calculated based on the running state of a vehicle and which is used to maintain a predetermined lane-position. The target assist control amount applied to a steering mechanism is then calculated based on the basic assist control amount, the lane-position maintenance assist control amount, and the compensation control amount.

With the power steering system and the control method thereof described above, the compensation control amount that is used to compensate for the basic control amount is corrected based on the lane-position maintenance assist control amount which is used to maintain the predetermined lane-position. Because the target assist control amount applied to the steering mechanism can be adjusted based on the state of the lane-position maintenance assist control, the steering feel during the lane-position maintenance assist control can be improved.

According to the invention, the compensation control amount that is used to compensate for the basic assist control amount is calculated and corrected, during calculation thereof, based on the lane-position maintenance assist control amount. Accordingly, the steering feel during the lane-position maintenance assist control can be improved.

BRIEF DESCRIPTION OF THE DRAWINGS

The features, advantages thereof, and technical and industrial significance of this invention will be better understood by reading the following detailed description of an example embodiment of the invention, when considered in connection with the accompanying drawings, in which.

DETAILED DESCRIPTION OF THE EXAMPLE EMBODIMENT

In the following description and the accompanying drawings, the invention will be described in more detail with reference to an example embodiment. Hereafter, the example embodiment will be described in detail with reference to accompanying drawings. To facilitate the understanding of the description, the same or corresponding portions will be denoted by the same reference numerals in the drawings, and will be described only once below.

Figure 1:
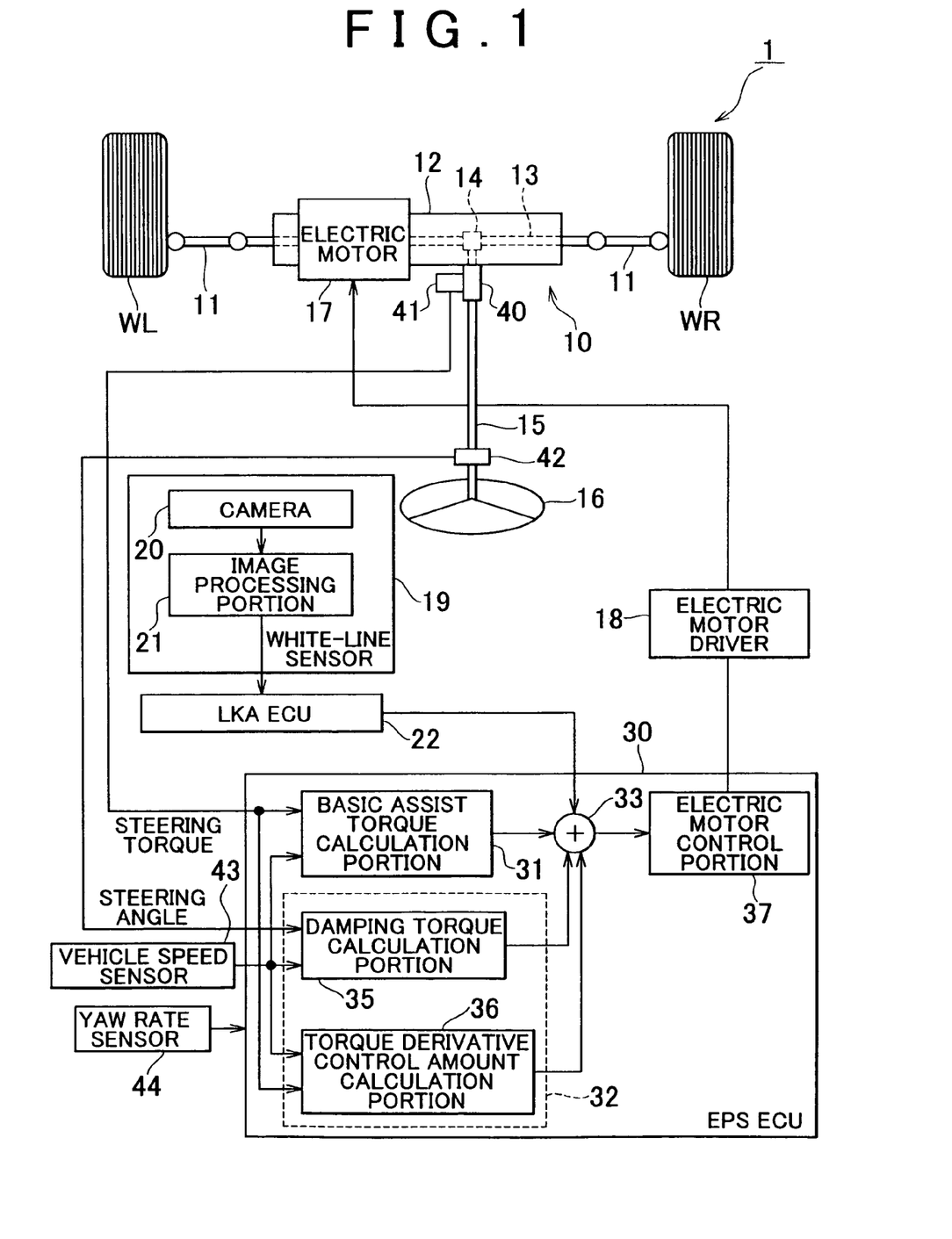
FIG. 1 illustrates the view showing the structure of a lane-position maintenance assist apparatus including a power steering system according to an embodiment of the invention.

First, the structure of a power steering system 10 according to the embodiment, and the structure of a lane-position maintenance assist apparatus 1 including the power steering system 10 will be described with reference to FIGS. 1 to 3. FIG. 1 illustrates the view showing the lane-position maintenance assist apparatus 1 including the power steering system 10 according to the embodiment. The lane-position maintenance assist apparatus 1 drives the power steering system 10 to assist a vehicle V in maintaining the proper lane-position. The power steering system 10 is, for example, a rack-coaxial type electric power steering system including a ball screw type conversion mechanism that converts the rotating torque generated by an electric motor into a force applied in the direction in which a rack shaft reciprocates.

In FIG. 1, reference characters WR, WL denote a right front wheel and a left front wheel serving as the steering wheels, respectively. The right front wheel WR and the left front wheel WL are connected to each other, via tie-rods 11, by a steering gear box 12. The steering gear box 12 includes a rack shaft 13, a pinion 14, etc. The rack shaft 13 is slidable with respect to the gear box 12. The tie-rods 11 are connected to the respective ends of the rack shaft 13. A driver's steering wheel 16 is connected to the pinion 14 via a steering shaft 15. When the driver's steering wheel 16 is operated, the right and left front wheels WR, WL are steered via the steering shaft 15, the pinion 14, the rack shaft 13 and the tie-rods 11.

Although not shown in the figure, a ball screw groove is formed in part of the outer surface of the rack shaft 13. A ball nut, which has a ball screw groove in its inner surface, is fixed to a rotor of an electric motor 17 arranged coaxially with the rack shaft 13. The ball screw groove of the ball nut corresponds to the ball screw groove of the rack shaft 13. Multiple balls are arranged between the paired ball screw grooves. The ball screw converts the rotational motion of the electric motor 17 into the reciprocating motion of the rack shaft 13. Namely, when the electric motor 17 is driven, the rack shaft 13 moves in its axial direction, and the steering operation is assisted.

The electric motor 17 is connected to an electric motor driver 18, and applies assist torque corresponding to the amount of driving current supplied from the electric motor driver 18 to the rack shaft 13. The electric motor driver 18 supplies the driving current to the electric motor 17 according to a command signal from an electronic control unit (hereinafter, referred to as an "EPS ECU") 30 included in the power steering system 10. The EPS ECU 30 transmits a command signal to the electric motor driver 18 according to the logic, described later, to drive the electric motor 17. Thus, the EPU ECU 30 causes the rack shaft 13 to move to steer the right and left front wheels WR, WL.

The steering shaft 15 is provided, for example, with a torsion bar 40 that is twisted based on the steering torque applied from the driver's steering wheel 16. The amount of twist of the torsion bar 40 and the direction in which the torsion bar 40 is twisted are detected by a steering torque sensor 41. The signal from the steering torque sensor 41 is transmitted to the EPS ECU 30.

The steering shaft 15 is provided with a steering angle sensor 42 formed, for example, of a rotary encoder. The steering angle sensor 42 outputs a signal indicating the direction in which the driver operates the driver's steering wheel (hereinafter, referred to as the "steering direction") and the steering angle input by the driver. The signal from the steering angle sensor 42 is transmitted to the EPS ECU 30. The EPS ECU 30 calculates the steering angle speed based on the steering angle of the driver's steering wheel 16 indicated by the signal from the steering angle sensor 42. Because there is a certain correlation between the rotation speed of the electric motor 17 and the steering angle speed, steering angle speed detection means may be configured to calculate the steering angle speed including the steering direction, by detecting the rotation direction and the rotation speed of the electric motor 17. In the description below, the steering angle speed is a positive value when the driver's steering wheel 16 is steered to the left, and is a negative value when the driver's steering wheel 16 is steered to the right.

In addition to the steering torque sensor 41 and the steering angle sensor 42, a vehicle speed sensor 43 that detects the speed of the vehicle V and a yaw rate sensor 44 are connected to the EPS ECU 30. The vehicle speed sensor 43 is a wheel speed sensor fitted to each wheel of the vehicle V, and outputs pulse signals at time intervals corresponding to the speed of the vehicle V. The signals from the vehicle speed sensor 43 are transmitted to the EPS ECU 30. The EPS ECU 30 calculates the vehicle speed based on the signals from the vehicle speed sensor 43. The yaw rate sensor 44 is arranged near the gravity center of the vehicle V. The yaw rate sensor 44 detects the yaw rate around the axis vertically extending at the gravity center of the vehicle V, and transmits the detection result to the EPS ECU 30.

Figure 2:
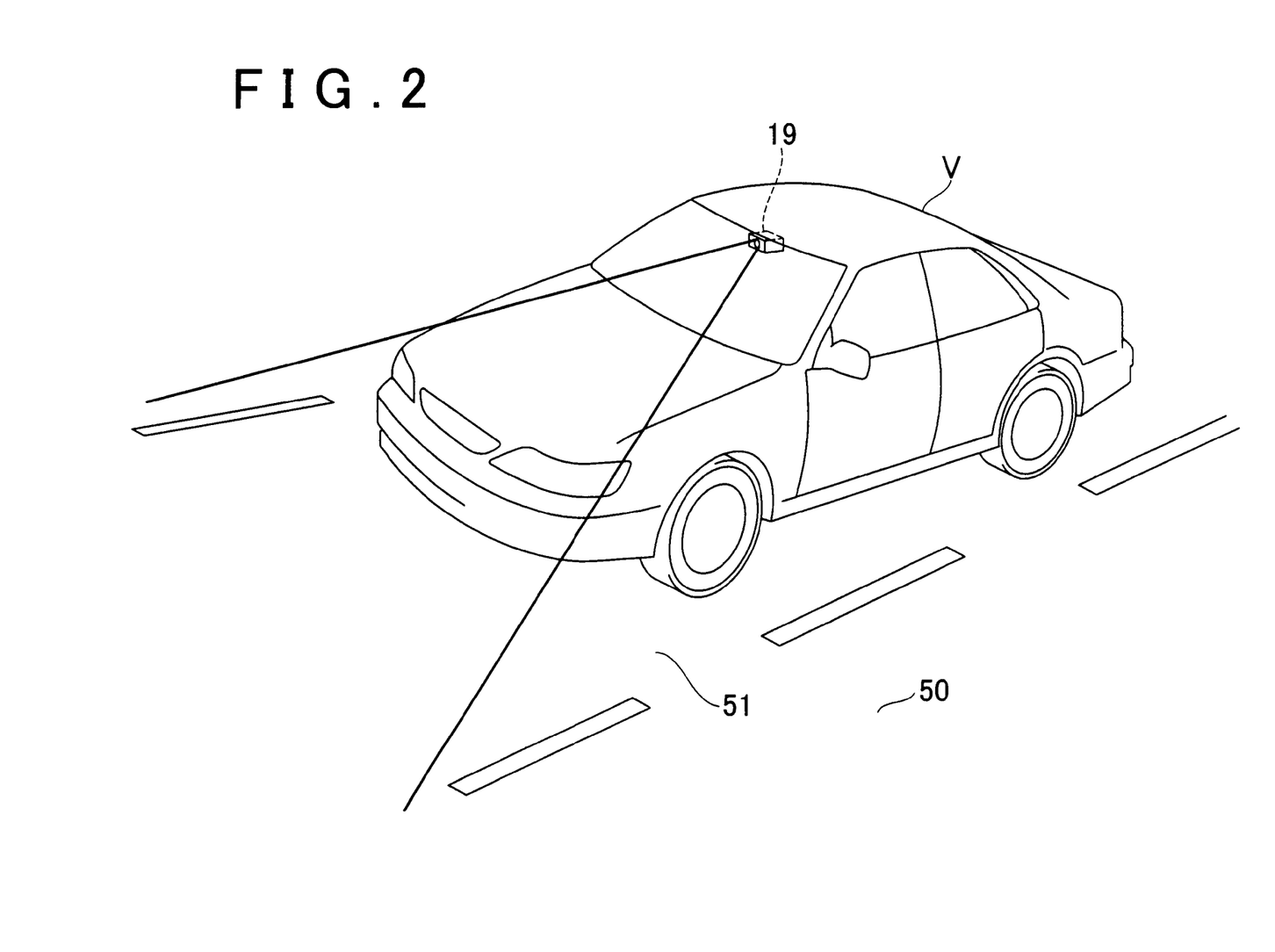
FIG. 2 illustrates the view for describing the manner in which the image of a cruising lane is captured by a camera.

A white line sensor 19 is fitted, for example, to the back face of a rear view mirror (see FIG. 2). The white line sensor 19 includes a camera 20 and an image processing portion 21. The camera 20 is, for example, a CCD (Charge-Coupled Device) camera. The camera 20 captures the image of a predetermined area ahead of the vehicle V through a windshield. More specifically, the camera 20 captures the dynamic picture image of the predetermined area in and near a cruising lane 51 of a road 50, in which the vehicle V is running. The image processing portion 21 is connected to the camera 20. The image data describing the area near the vehicle V, which is captured by the camera 20, is transmitted to the image processing portion 21.

The image processing portion 21 processes the image data captured by the camera 20, and detects the cruising lane 51 based on the road partition lines (hereinafter, referred to as the "white lines") drawn on the road on which the vehicle V is running. In the captured image and picture, the brightness significantly differs between the road surface and the white lines drawn on the road surface. Accordingly, the white lines partitioning the cruising lane 51 can be relatively easily detected, for example, by edge detection. It is, therefore, possible to easily detect the cruising lane 51 ahead of the vehicle V.

Figure 3:
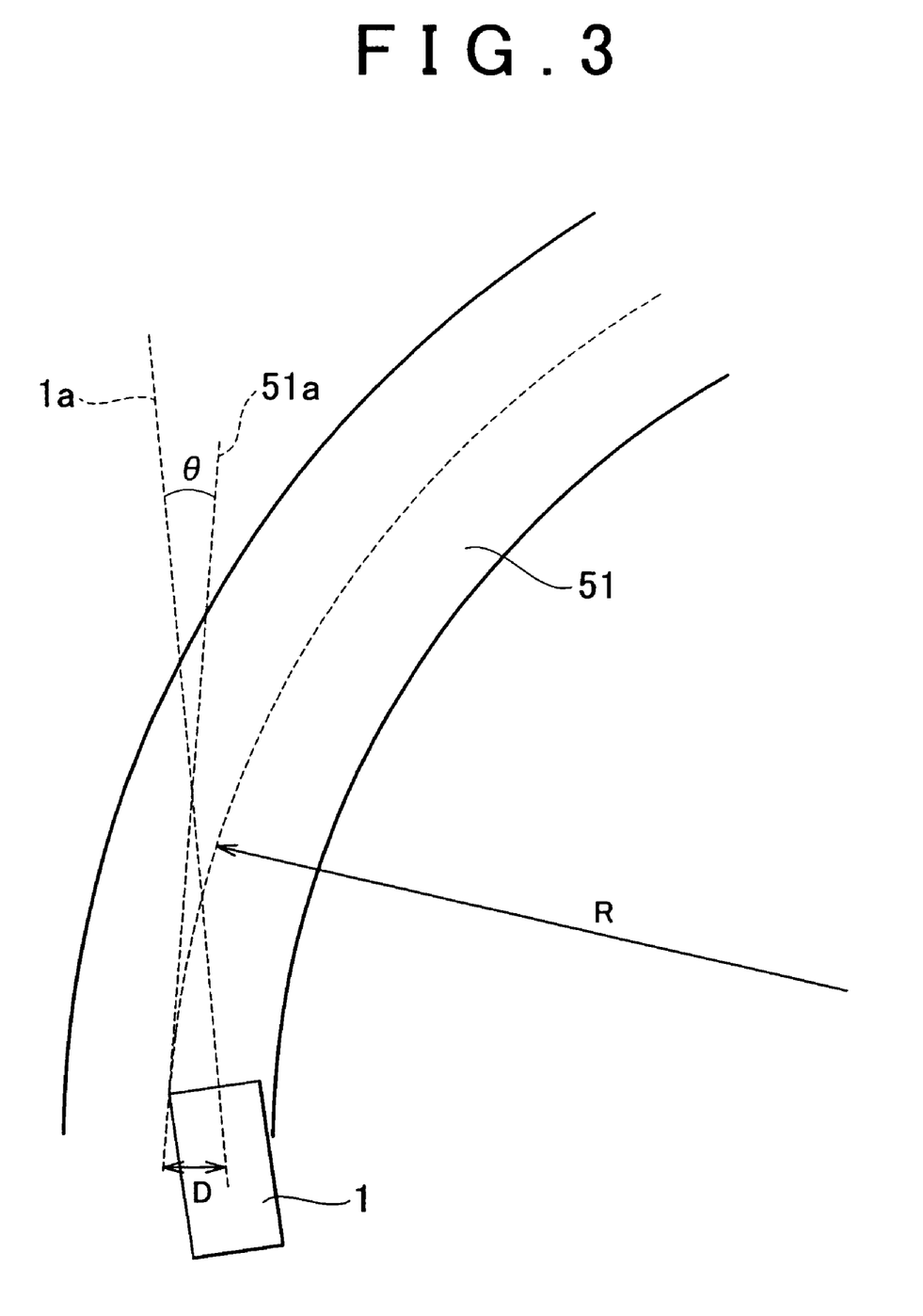
FIG. 3 illustrates the view for describing road parameters.

As shown in FIG. 3, the image processing portion 21 calculates, based on the detected cruising lane, the curvature of a curve in the cruising road ahead of the vehicle V (1/radius of the curve); the offset amount of the vehicle V with respect to the cruising lane (corresponding to the lateral offset between the gravity center of the vehicle V and a tangent 51a to the center line of the cruising lane 51 at the point corresponding to the gravity center of the vehicle V) (hereinafter, simply referred to as the "offset amount"); and the yaw angle (corresponding to the angle between the central axis 1a, extending in the longitudinal direction of the vehicle V, and the tangent 51a to the center line of the cruising lane 51 at the point corresponding to the gravity center of the vehicle V). The white line sensor 19 is connected to an electronic control unit for lane-position maintenance assist (hereinafter, referred to as a "LKA ECU") 22. The white line sensor 19 transmits the detection result to the LKA ECU 22. Each of the curvature of the curve ahead of the vehicle V, the offset amount, and the yaw angle is either a positive value or a negative value. In the embodiment, each of the curvature of the curve ahead of the vehicle V, the offset amount, and the yaw angle is a positive value, when the driver's steering wheel 16 is steered to the right. On the other hand, when the driver's steering wheel 16 is steered to the left, each of the curvature of the curve ahead of the vehicle V, the offset amount, and the yaw angle is a negative value. A known method may be employed to detect the information concerning the cruising lane and the running state of the vehicle V (the curvature of the curve ahead of the vehicle V, the offset amount and the yaw angle of the vehicle V) based on the image.

The LKA ECU 22 includes a microprocessor that performs calculation, ROM that stores, for example, programs for causing the microprocessor to perform various processes, RAM that stores various data such as calculation results, back-up RAM that stores the memory contents using a 12V battery, etc.

The LKA ECU 22 calculates the torque for assisting maintenance of the proper lane-position (hereinafter, referred to as the "lane-position maintenance assist torque") (i.e., the lane-position maintenance assist control amount) based on the curvature of the curve ahead of the vehicle V, the offset amount, the yaw angle, etc. The signal indicating the calculated lane-position maintenance assist torque is transmitted to an EPS ECU 30.

Similarly, the EPS ECU 30 includes a microprocessor that performs calculation, ROM that stores, for example, programs for causing the microprocessor to perform various processes, RAM that stores various data such as calculation results, back-up RAM that stores the memory contents using a 12V battery, etc.

With the configuration described above, a basic assist torque calculation portion 31, a compensation torque calculation portion 32, a target assist torque calculation portion 33, etc are formed in the EPS ECU 30. The basic assist torque calculation portion 31 calculates the basic assist torque (i.e., the basic assist control amount) based on the steering torque. The compensation torque calculation portion 32 calculates the compensation torque (i.e., the compensation control amount) that compensates for the basic assist torque. The target assist torque calculation portion 33 calculates the target assist torque (i.e., the target assist control amount) by adding the basic assist torque, the compensation torque, and the lane-position maintenance assist torque to each other.

The compensation torque calculation portion 32 includes a damping torque calculation portion 35 that calculates the damping torque (i.e., damping control amount) based on the steering angle speed, etc; a torque derivative control amount calculation portion 36 that calculates the torque derivative control amount based on the integrated value of the steering torque; and the like.

In addition, an electric motor control portion 37, etc. are formed in the ECU 30. The electric motor control portion 37 calculates the target current value based on the target assist torque calculated by the target assist torque calculation portion 33, and controls the value of current supplied to the electric motor 17.

Figure 4:
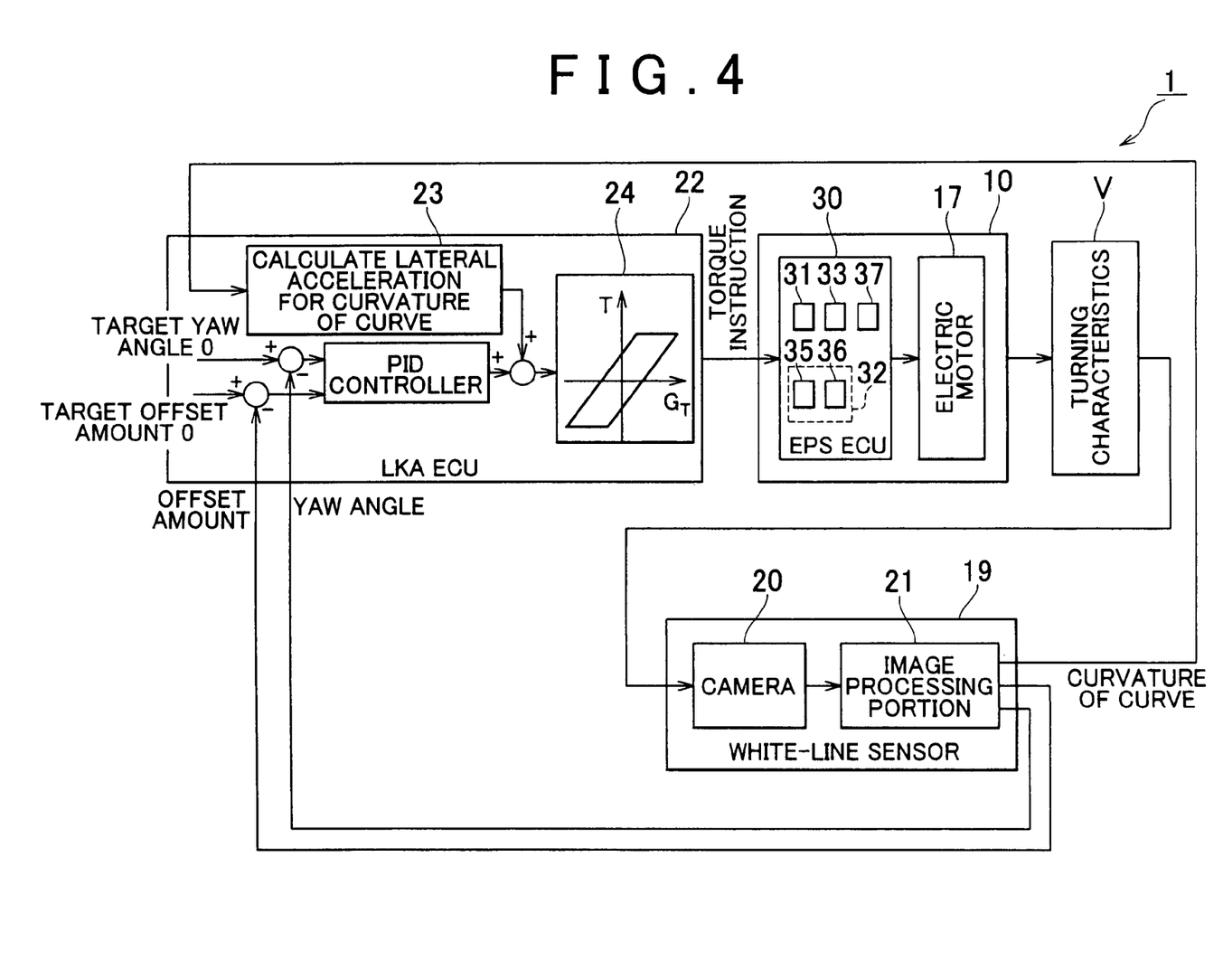
FIG. 4 illustrates the block diagram for describing the lane-position maintenance assist control including the steering assist control.

Next, the operation of the power steering system 10 during the lane-position maintenance assist control, namely, the cooperative control between the lane-position maintenance assist control and the steering assist control will be described with reference to FIGS. 4 to 9. FIG. 4 illustrates the block diagram showing the lane-position maintenance assist control including the steering assist control.

First, the image of the area ahead of the vehicle V is captured by the camera 20 included in the white line sensor 19. The image processing portion 21 calculates the condition of the cruising lane 51 (i.e., the curvature of a curve ahead of the vehicle V), the offset amount and the yaw angle of the vehicle V based on the captured image. The curvature of the curve ahead of the vehicle V is obtained by geometrically calculating the radius R of the curve ahead of the vehicle V based on captured image, and then deriving the reciprocal number of the radius R. The radius R may be geometrically obtained using the lateral offset between the center line of the cruising lane 51 and center line of the vehicle V, extending in the longitudinal direction of the vehicle V, at a position ahead of the vehicle V by a predetermined distance, or the angle which the tangent to the center line of the cruising lane 51 forms with the center line of the vehicle V at a position ahead of the vehicle V by a predetermined distance.

The offset amount and the yaw angle used as the target values for the cruising path are determined in advance as the target offset amount and the target yaw angle.

In the calculation of the control amount for lane-position maintenance assist, first, the lateral acceleration necessary for the vehicle V to go round a curve ahead of the vehicle V is calculated based on the curvature of the curve. The signal indicating the curvature of the curve ahead of the vehicle V is transmitted to a feed-forward controller 23 included in the LKA ECU 22. Then, the lateral acceleration for the curvature of the curve ahead of the vehicle V is calculated based on the predetermined characteristics.

The lateral acceleration required to compensate for the offset of the vehicle V with respect to the proper lane-position (to make the actual offset amount substantially equal to the target offset amount) is calculated by performing the PID (Proportional Integral Differential) control based on the deviation of the actual offset amount from the target offset amount.

Similarly, the lateral acceleration required to compensate for the deviation of the yaw angle (to make the actual yaw angle substantially equal to the target yaw angle) is calculated by performing the PID control based on the deviation of the actual yaw angle from the target yaw angle.

The target acceleration is calculated by adding the three lateral accelerations, calculated as described above, to each other. The steering amount required to generate the target lateral acceleration, namely, the lane-position maintenance assist torque that the electric motor 17 should generate is calculated by a torque computing unit 24 included in the LKA ECU 22. The signal indicating the lane-position maintenance assist torque is transmitted to the EPS ECU 30.

In the EPS ECU 30 included in the power steering system 10, first, the basic assist torque calculation portion 31 calculates the basic assist torque. The basic assist torque calculation portion 31 stores a two dimensional map (i.e., a basic assist torque map) that defines the relationship between the steering torque and the basic assist torque. The basic assist torque is calculated by applying the steering torque indicated by the signal from the steering torque sensor 41 in the basic assist torque map. The signal indicating the calculated basic assist torque is transmitted to the target assist torque calculation portion 33. The basic assist torque is a value of a basic torque for supplying a force for assisting the operation of the driver's steering wheel 16.

Figure 5:
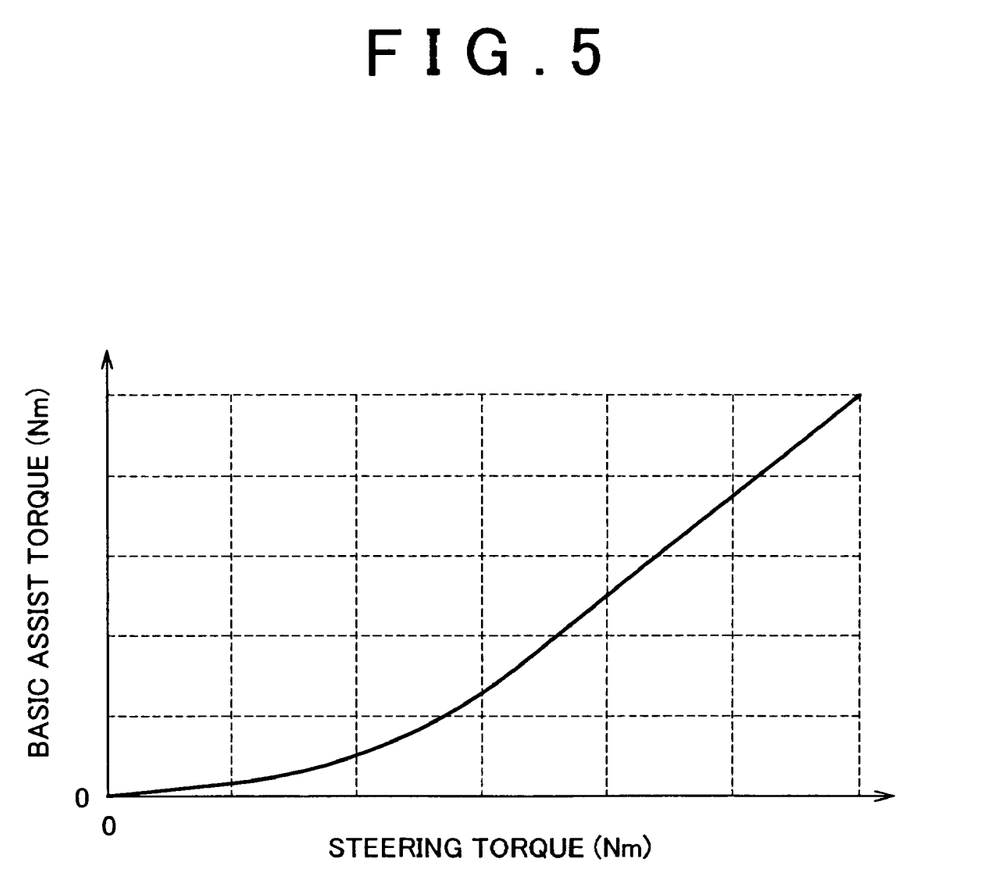
FIG. 5 illustrates the graph showing an example of a basic assist torque map.

The basic assist torque map is set such that the basic assist torque increases as the steering torque increases, as shown in FIG. 5.

Figure 6A:
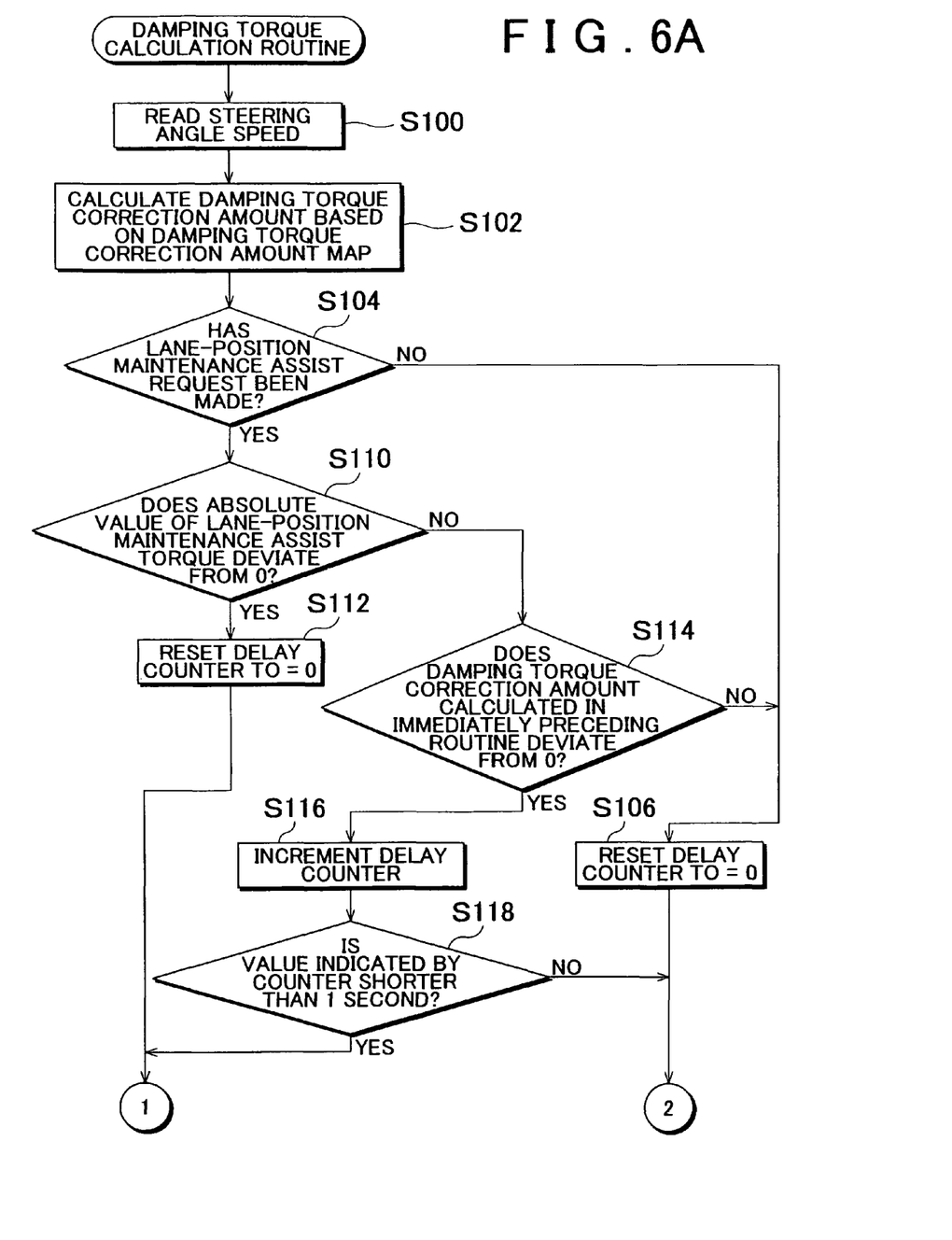
FIGS. 6A and 6B illustrate the flowchart of the damping torque calculation routine.
Figure 6B:
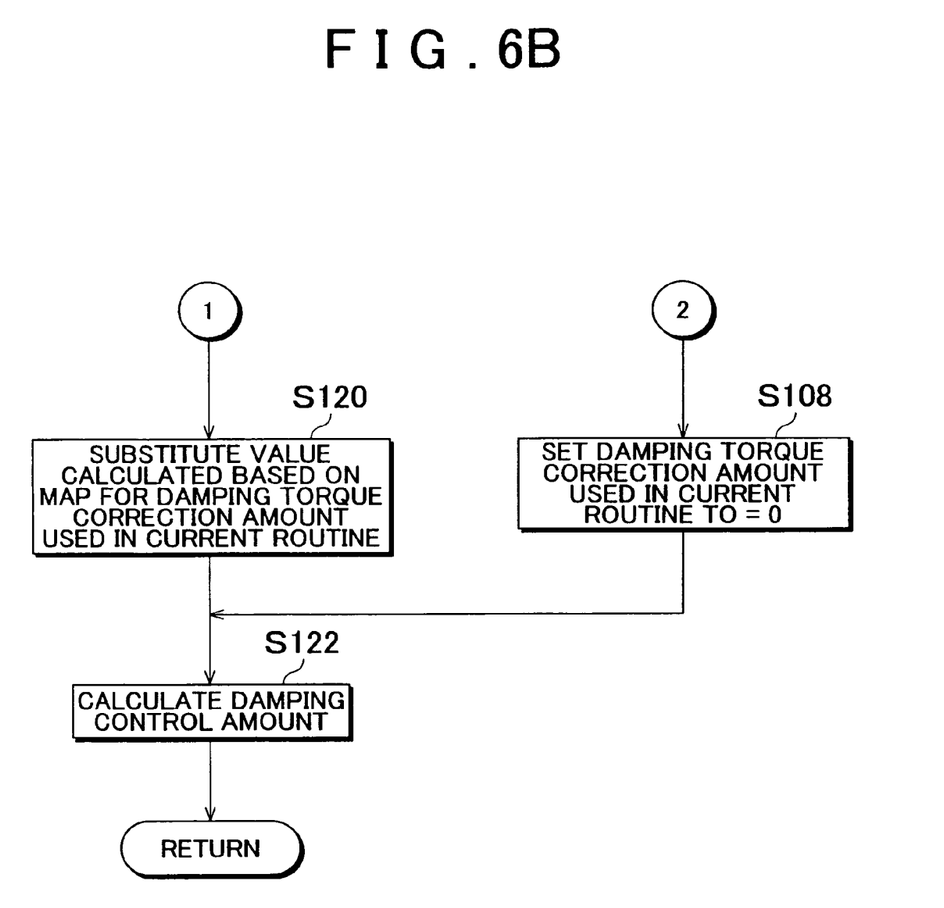

Meanwhile, the damping torque calculation portion 35 calculates the damping torque applied to improve convergence of the steering operation. The method for calculating the damping torque will be described with reference to FIGS. 6A and 6B. FIGS. 6A and 6B illustrate the flowchart of the damping torque calculation routine. The signal indicating the calculated damping torque is transmitted to the target assist torque calculation portion 33.

In step S100, the steering angle speed is read. In step S102, the damping torque correction amount is calculated based on the steering angle speed read in step S100. More specifically, the damping torque calculation portion 35 stores a two dimensional map (i.e., a damping torque correction amount map) that defines the relationship between the steering angle speed and the damping torque correction amount, and the damping torque correction amount is calculated by applying the steering angle speed in the damping torque correction amount map.

Figure 7:
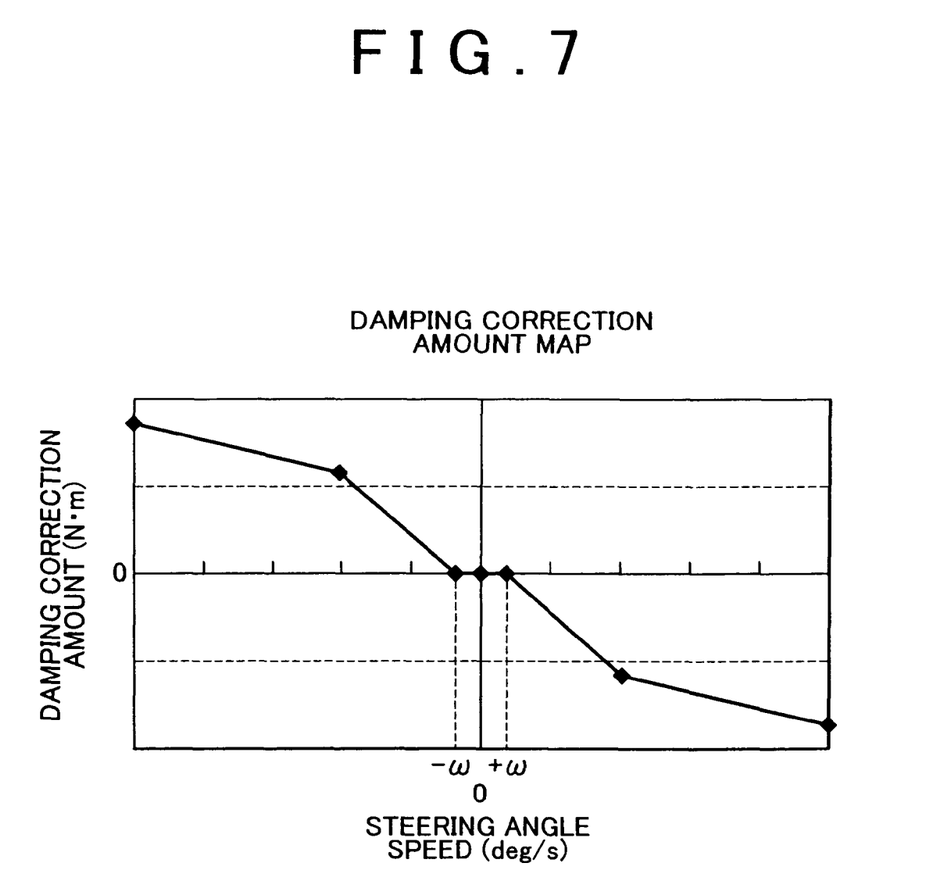
FIG. 7 illustrates the graph showing an example of a damping correction amount map for lane-position maintenance assist control.

As shown in FIG. 7, the damping torque correction amount map is set such that, when the steering angle speed is within a predetermined range including zero (−ω<steering angle speed<+ω), the damping correction amount is zero. On the other hand, when the steering angle speed is out of the predetermined range (−ω≧steering angle speed or +ω≦steering angle speed), the absolute value of the damping torque increases as the absolute value of the steering angle speed increases.

In step S104, it is determined whether a request for assistance in maintaining the proper lane-position (hereinafter, referred to as a "lane-position maintenance assist request") has been made. If it is determined in step S104 that the lane-position maintenance assist request has not been made, a delay counter, which counts the time that has elapsed since the lane-position maintenance assist torque becomes zero, is reset to zero in step S106. In step S108, the damping torque correction amount (the value used in the current routine) is set to zero. Then, step S122 is performed. On the other hand, if it is determined in step S104 that the lane-position maintenance assist request has been made, step S110 is performed.

In step S110, it is determined whether the absolute value of the lane-position maintenance assist torque deviates from zero. If it is determined that the absolute value of the lane-position maintenance assist torque deviates from zero, the delay counter is reset to zero in step S112, and step S120 is performed. On the other hand, if it is determined that the absolute value of the lane-position maintenance assist torque is zero, step S114 is performed.

In step S114, it is determined whether the damping torque correction amount calculated in the immediately preceding routine deviates from zero. If it is determined that the damping torque correction amount calculated in the immediately preceding routine deviates from zero, the delay counter is incremented in step S116, and step S118 is performed. On the other hand, if it is determined that the damping torque correction amount calculated in the immediately preceding routine is zero, the delay counter is reset to zero in step S106, and the damping torque correction amount (the value used in the current routine) is set to zero in step S108. Then, step S122 is performed.

In step S118, it is determined whether the value indicated by the delay counter is shorter than one second, namely, whether the time that has elapsed since the it is determined that there is no lane-position maintenance torque request is shorter than one second. If it is determined that the value indicated by the delay counter is shorter than one second, step S120 is performed. On the other hand, if it is determined that the value indicated by the delay counter is equal to or longer than one second, the damping torque correction amount (the value used in the current routine) is set to zero in step S108, and step S122 is performed.

In step S120, the value calculated in step S102 based on the map is substituted for the damping torque correction amount (the value used in the current routine).

In step S122, the post-correction damping torque is calculated by adding the damping torque correction amount calculated in step S120 or step S108 to the normal damping torque calculated based on the steering angle speed and the vehicle speed. Thus, the damping torque is increased during the steering assist control by adding the damping torque correction amount to the normal damping torque. After step S122 is performed, the routine ends.

Figure 8:
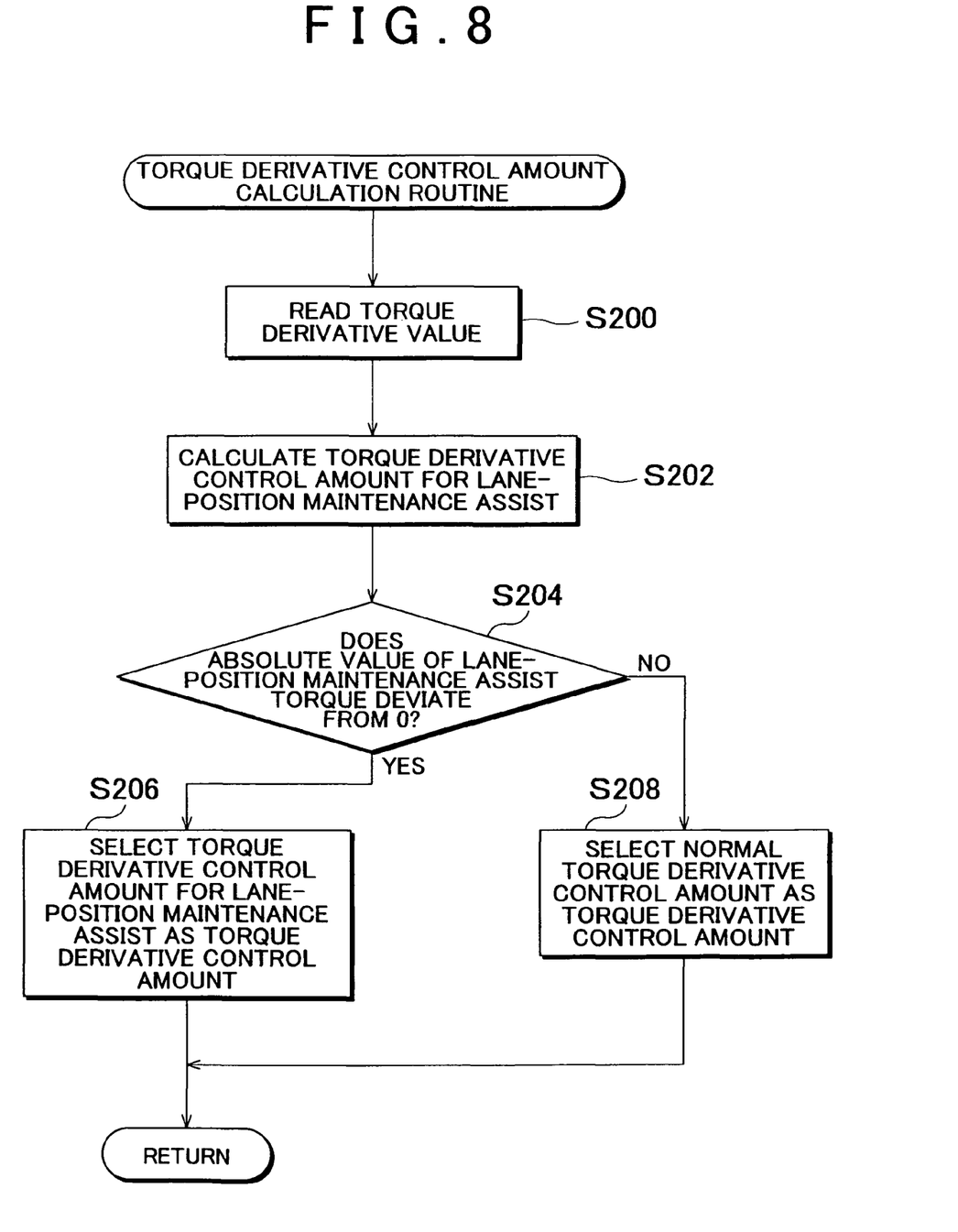
FIG. 8 illustrates the flowchart of the torque derivative control amount calculation routine.

Referring again to FIG. 4, the torque derivative control amount calculation portion 36 calculates the torque derivative control amount used to reduce fluctuation in the steering torque based on the derivative value of the steering torque, etc. The method for calculating the torque derivative control amount will be described with reference to FIG. 8. FIG. 8 illustrates the flowchart of the torque derivative control amount calculation routine. The signal indicating the torque derivative control amount is transmitted to the target assist torque calculation portion 33.

In step S200, the derivative value of the steering torque is read. In step S202, the torque derivative control amount for lane-position maintenance assist is calculated based on the derivative value of the steering torque read in step S200. More specifically, the torque derivative control amount calculation portion 36 stores a two dimensional map (the torque derivative control amount map for lane-position maintenance assist) that defines the relationship between the steering torque derivative value and the torque derivative control amount for lane-position maintenance assist, and the torque derivative control amount for lane-position maintenance assist is calculated by applying the steering torque derivative value in the torque derivative control amount map for lane-position maintenance assist.

Figure 9:
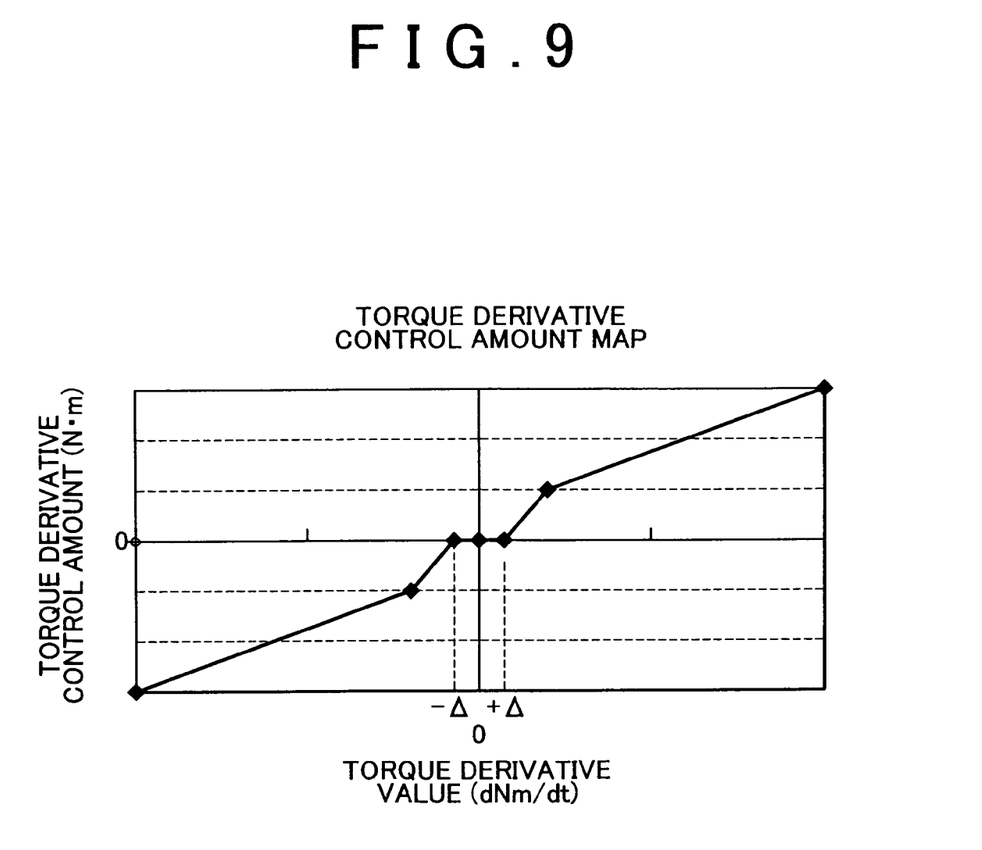
FIG. 9 illustrates the graph showing an example of a torque derivative correction amount map for lane-position maintenance assist control.

As shown in FIG. 9, the torque derivative control amount map for lane-position maintenance assist is set such that, when the steering torque derivative value is within a predetermined range including zero (−Δ<steering torque derivative value<+Δ), the torque derivative control amount for lane-position maintenance assist is zero. On the other hand, when the steering torque derivative value is out of the predetermined range (−Δ≧steering torque derivative value or +Δ≦steering torque derivative value), as the absolute value of the steering torque derivative value increases, the absolute value of the torque derivative control amount for lane-position maintenance assist increases.

In step S204, it is determined whether the absolute value of the lane-position maintenance assist torque deviates from zero. If it is determined that the absolute value of the lane-position maintenance assist torque deviates from zero, the torque derivative control amount for lane-position maintenance assist, calculated in step S202, is selected as the torque derivative control amount in step S206. On the other hand, when the absolute value of the lane-position maintenance assist torque is zero, the normal torque derivative control amount calculated based on the steering angle speed and the vehicle speed is selected as the torque derivative control amount in step S208. The torque derivative control amount for lane-position maintenance assist is set to be greater than the normal torque derivative control amount, at the same steering torque derivative value. Accordingly, the torque derivative control amount is increased during the lane-position maintenance assist control. After step S206 or step S208 is performed, the routine ends.

Referring again to FIG. 4, the target assist torque calculation portion 33 calculates the target assist torque by adding the basic assist torque calculated by the basic assist torque calculation portion 31, the damping torque calculated by the damping torque calculation portion 35, the torque derivative control amount calculated by the torque derivative control amount calculation portion 36, and the lane-position maintenance assist torque calculated by the LKA ECU 22 to each other. The signal indicating the calculated target assist torque is transmitted to the electric motor control portion 37.

The electric motor control portion 37 sets the target current value used to drive the electric motor 17 based on the target assist torque. The electric motor 17 is driven when the output current, which is controlled to match the target electric current, is supplied to the electric motor 17. More specifically, the time during which a switching element is supplied with electric power is set based on the target current value, and a control signal is transmitted to the electric motor driver 18 based on the time. Thus, electric current corresponding to the target electric current value is supplied to the electric motor 17, and the torque corresponding to the electric current is applied to the rack shaft 13. As a result, the right front wheel WR and the left front wheel WL are steered, and the vehicle V is turned so as to maintain the proper lane-position. When the vehicle V is turned, the area ahead of the vehicle V is captured by the camera 20 again, and the operation described above is repeated.

According to the embodiment, fluctuation in the target assist torque can be suppressed by increasing the damping torque for improving convergence of the steering based on the state of the lane-position maintenance assist control. Therefore, vibration of the driver's steering wheel due to the lane-position maintenance assist torque can be suppressed, and the steering feel during the lane-position maintenance assist control can be improved.

Even if the lane-position maintenance assist torque is zero for a short time, correction for increasing the damping torque is continuously made. Accordingly, even if the lane-position maintenance assist torque becomes zero during fluctuation, reduction in the damping effect can be suppressed.

According to the embodiment, the derivative value of the steering torque, namely, the torque derivative control amount, which is calculated based on the amount of change in the reaction force of the lane-position maintenance assist torque applied to the steering mechanism, is increased based on the state of the lane-position maintenance assist control, whereby the control amount that is applied in the direction opposite to the direction in which the assist torque is applied increases. As a result, fluctuation in the steering torque felt by the driver can be reduced.

While the invention has been described with reference to the example embodiment thereof, is to be understood that the invention is not limited to the exemplary embodiment or constructions. To the contrary, the invention is intended to cover various modifications and equivalent arrangements. For example, the configuration of the ECUs, the division of roles between the LKA ECU 22 and the EPS ECU are not limited to those in the embodiment described above. For example, the LKA ECU 22 and the EPS ECU 30 may be configured using the shared hardware (ECU).

The methods for correcting the damping torque and the torque derivative control amount are not limited to those described in the embodiment. For example, the damping torque and the torque derivative control amount may be calculated using a correction coefficient corresponding to the lane-position maintenance assist torque, instead of using a map.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are exemplary, other combinations and configurations, including more, less or only a single element, are also within the sprit and scope of the invention.

What is claimed is:

1. A power steering system, comprising:
   at least one controller that calculates a basic assist control amount based on a detected steered state of a driver's steering wheel, that calculates a compensation control amount used to compensate for the basic assist control amount, the compensation control amount including a damping control amount that is based on a detected steering wheel angle of the driver's steering wheel, and that corrects, during calculation of the compensation control amount, the damping control amount based on a lane-position maintenance assist control amount that is calculated based on a running state of a vehicle and used to maintain a predetermined lane-position,
   wherein the at least one controller calculates a target assist control amount applied to a steering mechanism based on the basic assist control amount, the lane-position maintenance assist control amount, and the compensation control amount, and
   wherein the at least one controller applies the target assist control amount to the steering mechanism of the power steering system so as to control operation of the steering mechanism.

2. The power steering system according to claim 1, wherein the basic assist control amount includes a basic assist torque, the compensation control amount includes a compensation torque, the lane-position maintenance assist control amount includes a lane-position maintenance assist torque, and the target assist control amount includes a target assist torque.

3. The power steering system according to claim 1, wherein the lane-position maintenance assist control amount is calculated based on the running state of the vehicle, and the running state of the vehicle includes a curvature of a curve ahead of the vehicle, an offset amount of the vehicle relative to the predetermined lane-position, and a yaw angle of the vehicle.

4. The power steering system according to claim 1, wherein the at least one controller corrects the damping control amount by increasing an absolute value of the damping control amount, when the lane-position maintenance assist control amount deviates from a value at or around zero.

5. The power steering system according to claim 4, wherein when a steering angle speed is out of a predetermined range, an absolute value of a correction amount of the damping control amount increases as an absolute value of the steering angle speed increases.

6. The power steering system according to claim 4, wherein the at least one controller continues the correction to increase the absolute value of the damping control amount until a predetermined time has elapsed since the lane-position maintenance assist control amount was the value at or around zero.

7. The power steering system according to claim 1, wherein
the compensation control amount includes a torque derivative control amount that is calculated based on a derivative value of a detected steering torque, and
the at least one controller corrects the torque derivative control amount based on the lane-position maintenance assist control amount by increasing an absolute value of the torque derivative control amount, when the lane-position maintenance assist control amount deviates from a value at or around zero.

8. The power steering system according to claim 7, wherein when the derivative value of the detected steering torque is out of a predetermined range, the absolute value of the torque derivative control amount increases as an absolute value of the derivative value of the steering torque increases.

9. A power steering system, comprising:
basic control amount calculation means for calculating a basic assist control amount based on a detected steered state of a driver's steering wheel;
compensation control amount calculating means for calculating a compensation control amount used to compensate for the basic assist control amount, the compensation control amount including a damping control amount that is based on a detected steering wheel angle of the driver's steering wheel, and for correcting, during calculation of the compensation control amount, the damping control amount based on a lane-position maintenance assist control amount that is calculated based on a running state of a vehicle and used to maintain a predetermined lane-position;
target control amount calculating means for calculating a target assist control amount applied to a steering mechanism based on the basic assist control amount, the lane-position maintenance assist control amount, and the compensation control amount; and
means for applying the target assist control amount to the steering mechanism of the power steering system so as to control operation of the steering mechanism.

10. The power steering system according to claim 9, wherein the basic assist control amount includes a basic assist torque, the compensation control amount includes a compensation torque, the lane-position maintenance assist control amount includes a lane-position maintenance assist torque, and the target assist control amount includes a target assist torque.

11. The power steering system according to claim 9, wherein the lane-position maintenance assist control amount is calculated based on the running state of the vehicle, and the running state of the vehicle includes a curvature of a curve ahead of the vehicle, an offset amount of the vehicle relative to the predetermined lane-position, and a yaw angle of the vehicle.

12. A power steering system, comprising:
a controller that calculates a basic assist control amount based on a detected steered state of a driver's steering wheel, and that calculates at least one of a damping control amount that is calculated based on a detected steering wheel angle of the driver's steering wheel and a torque derivative control amount that is calculated based on a derivative value of a detected steering torque and corrects to increase the at least one of the damping control amount and the torque derivative control amount, during calculation of the at least one of the damping control amount and the torque derivative control amount, when a lane-position maintenance assist control which is performed based on a running state of a vehicle and which is used to maintain a predetermined lane-position is being executed,
wherein the controller calculates a target assist control amount applied to a steering mechanism based on the basic assist control amount, a lane-position maintenance assist control amount, and the at least one of the damping control amount and the torque derivative control amount.

* * * * *